United States Patent [19]

Thomas

[11] 3,961,813
[45] June 8, 1976

[54] TRAILER HITCH
[75] Inventor: O. Leon Thomas, Carrollton, Ga.
[73] Assignee: Southwire Company, Carrollton, Ga.
[22] Filed: Mar. 25, 1975
[21] Appl. No.: 561,911

[52] U.S. Cl. .............................. 280/485; 267/138; 403/224; 403/225
[51] Int. Cl.² .............................................. B60D 1/00
[58] Field of Search ........... 280/483, 484, 485, 486, 280/487, 506; 267/136, 137, 138; 403/224, 225, 226

[56] References Cited
UNITED STATES PATENTS

| | | | |
|---|---|---|---|
| 2,324,997 | 7/1943 | Brown | 403/224 X |
| 2,428,950 | 10/1947 | Weiss | 280/485 |
| 2,743,943 | 5/1956 | Furrer | 280/485 |
| 3,677,869 | 7/1972 | Chung et al. | 267/138 X |

Primary Examiner—Robert R. Song
Assistant Examiner—R. Schrecengost
Attorney, Agent, or Firm—Van C. Wilks; Herbert M. Hanegan; Stanley L. Tate

[57] ABSTRACT

This disclosure relates to a trailer hitch for coupling a draft vehicle to a drawn vehicle wherein the eye portion of the hitch includes a molded insert of flexible material having an axial bore extending therethrough adapted to receive the pintle portion of the hitch in coupling relation. The flexible insert completely surrounds the pintle and thus maintains the pintle in spaced relation from the eye for yieldingly restraining relative radial movement between the pintle and the eye during all phases of operation, including flexing in the vertical plane when the trailer is negotiating inclined ramps or the like.

9 Claims, 2 Drawing Figures

TRAILER HITCH

BACKGROUND OF THE INVENTION

This invention relates to an improved trailer hitch for vehicles and the like, and more particularly it relates to a coupling or hitch adapted to connect a draft vehicle to a drawn vehicle wherein the coupling includes a drawbar extending from one of the vehicles and having an eye mounted thereon adapted to be received within a female coupling portion extending from the other vehicle, and wherein a pintle is provided to unite and couple the eye with the female coupling.

Eye and pintle coupling arrangements for hitching a trailer to a tractor or the like are well known in the art. These arrangements are generally simple, reliable and facilitate rapid engagement and disengagement. However, the so-called pintle hook is subject to metal-to-metal wear and, because of the slack in the hitch, it is susceptible to shock and a noisy bang-bang effect during starts and stops. This condition is particularly prevalent and exaggerated when the hitch is used to couple a plurality of vehicles or carts in a train-like arrangement.

The prior art has sought to overcome the aforementioned disadvantages in the conventional pintle hook by providing various means for absorbing these shocks and preventing the metal-to-metal wear. Generally, this has been accomplished, to a limited extent, simply by taking up the slack in the coupling and maintaining the pintle in abutting relation against an inner edge of the eye. For example, in U.S. Pat. No. 1,875,969 issued to D. S. Weiss, a jack arrangement is provided to press the pintle hook tightly against the eye.

Because jack arrangements of the aforementioned type did not provide sufficient flexibility during operation, the prior art then provided various resilient devices for yieldingly maintaining the pintle in abutting relation against a portion of the hook. For example, U.S. Pat. No. 2,370,679, issued to L. A. Martinelli et al., disclosed an hydraulic shock absorber for accomplishing the intended result. Similarly, U.S. Pat. No. 2,984,502, issued to B. I. Tyrrell, disclosed a spring arrangement for providing the resilient restraint. A resilient cushion accomplished the same results in the device disclosed in U.S. Pat. No. 3,531,141 issued to T. B. Dalton.

It should be apparent, however, that in each of the aforementioned prior art devices there will still be a certain amount of metal-to-metal wear between the pintle and the eye even though the slack in the coupling has been taken up by means of the particular arrangement disclosed. This problem was addressed in U.S. Pat. No. 2,998,268, issued to C. P. Witter, which provided a "friction material" which is both hard and has a high coefficient of friction (e.g., brake lining material) to completely surround the pintle and thus prevent metal-to-metal wear against the eye. The pintle is then securely tightened into the eye by suitable jack means. The pintle is, in effect, journaled in the eye for rotation in the horizontal plane; however, the hitch cannot be articulated in the vertical plane, and thus a separate pivotable connection must be provided to accomplish flexing in the vertical plane so as to enable the vehicle to negotiate ramps and the like. It should be apparent, therefore, that the device disclosed in the Witter patent is both complicated and expensive, not only because of the need for the separate pivotable connection, but also because of the high cost of the required bearing lining material which is subject to excessive wear in the particular construction disclosed.

SUMMARY OF THE INVENTION

In view of the foregoing, it should be apparent that there is still a need in the art for a trailer hitch which can take up the slack inherent in a conventional pintle hook coupling, eliminate the hammering effect and metal-to-metal wear, while at the same time avoid the disadvantages in prior art devices of this type. It is, therefore, a primary object of this invention to provide a trailer hitch that prevents metal-to-metal wear, and that can be resiliently articulated in the vertical plane.

More particularly, it is an object of this invention to provide a trailer hitch of the eye and pintle type, wherein resilient means are provided for substantially completely surrounding the pintle thereby maintaining the pintle in spaced relation from the eye and yieldingly restraining the relative radial movement between the pintle and the eye during operation.

Another object of this invention is to provide a trailer hitch of the type described above which is adapted to reduce or eliminate metal-to-metal wear, noise, shock, jackknifing on ramps, poor tracking, safety hazards and maintenance costs.

Briefly described, these and other objects of the invention that may become more apparent hereinafter, are accomplished by constructing the coupling eye in the form of an enlarged ring-shaped housing having an annular channel formed in the inner periphery thereof, and mounting a resilient insert of flexible material such as polyurethane plastic in the annular channel of the ring-shaped housing.

The resilient insert includes an axial bore extending vertically therethrough which is adapted to receive the coupling pintle.

It should be apparent, therefore, that the resilient insert not only maintains the pintle in spaced relation from the eye thereby preventing metal-to-metal contact therebetween, but also yieldingly permits articulation of the coupling in the vertical plane so as to enable the vehicles joined by the coupling to negotiate ramps and the like.

With the above and other objects in view that may become hereinafter apparent, the nature of the invention may be more clearly understood by reference to the several views illustrated in the attached drawing, the following detailed description thereof, and the appended claimed subject matter:

In The Drawing:

FIG. 1 is a fragmentary perspective view of the trailer hitch of this invention, having portions thereof cut away for clarity to illustrate the molded resilient insert mounted within the enlarged eye of the coupling, with the pintle extending downwardly therethrough; and FIG. 2 is a side elevation of the coupling, and illustrates diagrammatically the manner in which the coupling may flex to facilitate articulation thereof in the vertical plane.

DETAILED DESCRIPTION OF PREFERRED EMBODIMENT

Figure 1:
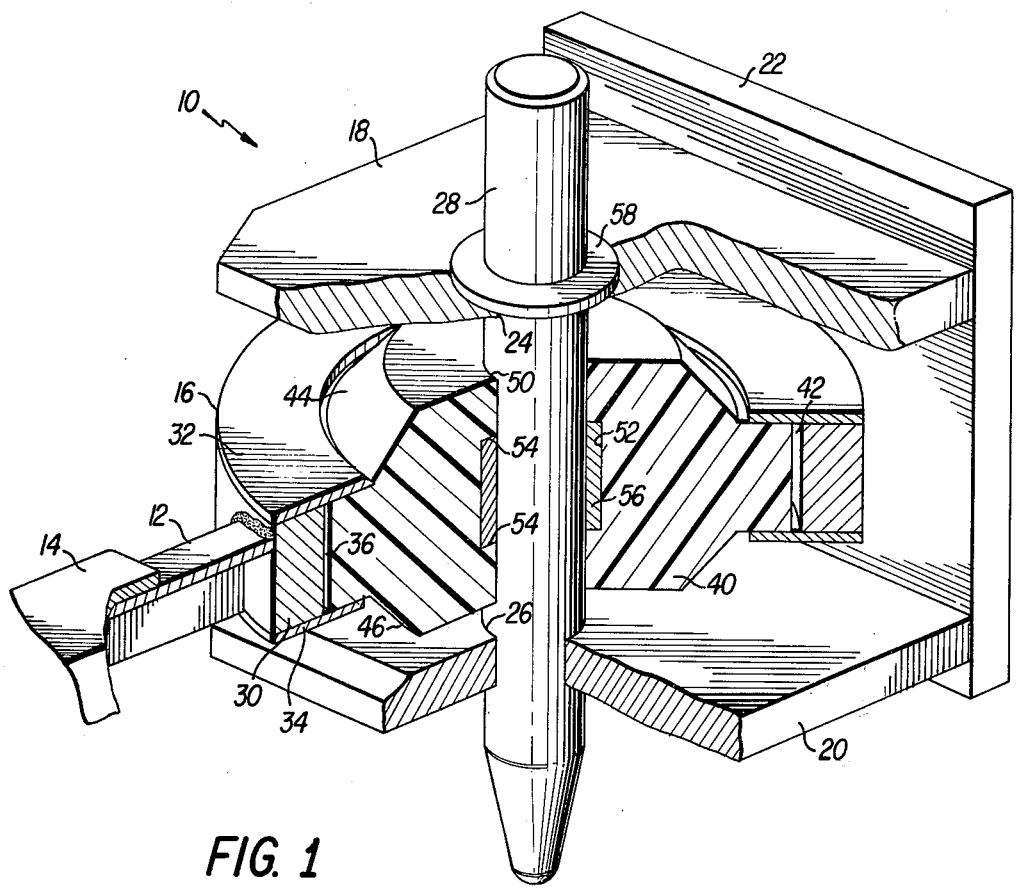

Referring now to the drawing in detail, there is illustrated in FIG. 1 the novel trailer hitch of this invention designated generally by the numeral 10. The trailer hitch 10 includes a male portion 12 extending from the drawbar 14 of a drawn vehicle or the like (not shown).

The male portion 12 includes a ring-shaped eye 16 adapted to be received between spaced parallel plates 18, 20 comprising the female portion of the hitch. The plates 18, 20 extend from a bracket 22 which is adapted to be connected to the rear of a draft vehicle (not shown) such as a tractor. The plates 18, 20 include coaxial holes 24, 26 formed therein which are adapted to receive a pintle 28 for coupling together the male and female portions of the hitch 10.

The eye 16 includes an annular ring 30 having circular ring-shaped plates 32, 34 suitably secured to the upper and lower edges thereof, respectively. As seen in FIG. 1, the plates 32, 34 extend inwardly beyond the inner periphery of the annular ring 30 thereby defining an annular channel 36 therewith.

A flexible insert 40 of elastomeric material, such as molded polyurethane plastic, is mounted in the annular channel 36 of the eye 16. A slight clearance 42 is preferably provided between the outer periphery of the insert 40 and the inner surface of the ring 30.

The insert 40 is preferably molded to include upper and lower truncated conical portions 44, 46 adapted to extend vertically beyond the planes of the plates 32, 34. It should be apparent that these truncated conical portions 44, 46 prevent contact between the plates 18, 20 and the eye 16.

The insert 40 further includes a vertically extending bore 50 having a countersunk portion 52 terminating in a shoulder 54. The bore 50 permits the pintle 28 to extend therethrough for coupling the male and female portions of the hitch 10.

A metal sleeve 56 is mounted on the pintle 28, and is adapted to abut against the shoulder 54 of the bore 50, thereby securely mounting the pintle 28 therein. The metal sleeve 56 is adapted to evenly distribute compression loads applied by the pintle 28 during flexing over a large portion of the insert 40.

The pintle 28 further includes a stop plate 58 at the upper end thereof which is adapted to abut against the upper plate 18 for limiting the axial extent of the pintle 28 through the bore 50. The pintle 28 may further include a lock pin (not shown) at the lower end thereof as an extra safety feature.

Figure 2:
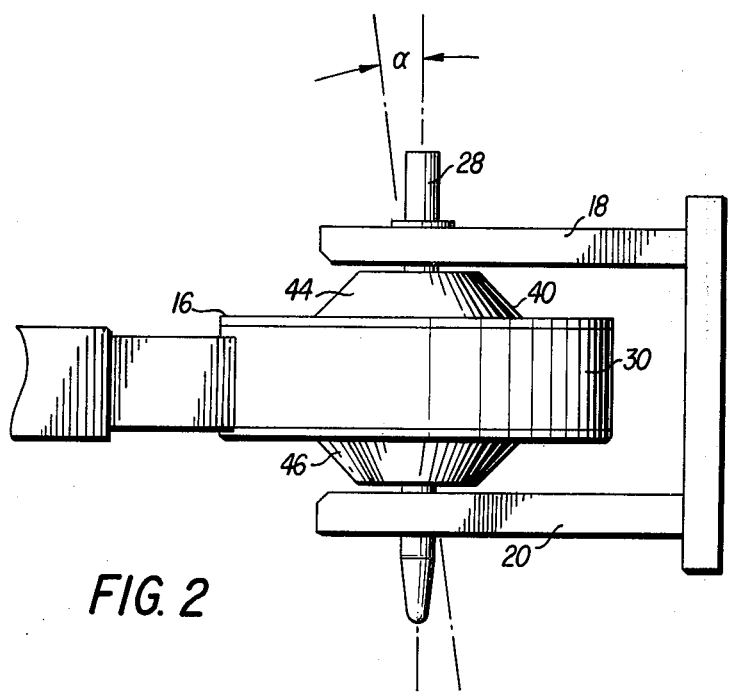

As seen in FIG. 2, the resilience of the flexible insert 40 permits the pintle 28 to flex through a particular angle α when the vehicles coupled by the hitch 10 are negotiating or a ramp or the like. The annular clearance 42 provided between the outer periphery of the insert 40 and the inner surface of the ring 30 permits the flexible insert 40 to deform radially outwardly into the annular channel 36 when the pintle 28 flexes through the angle α and thus becomes inclined with respect to the axis of the eye 16. Thus, it should be apparent that the novel hitch 10 of this invention prevents metal-to-metal wear not only during movement of the coupled vehicles along a flat surface, but also during travel up and down inclined ramps and the like. Furthermore, the truncated conical portions 44, 46 of the insert 40 additionally serve to maintain the metal parts of the hitch 10 in spaced relation from one another. Optionally washer 58 may have one flat side on its circumference to abut a key, thereby preventing rotation of pintle means 28.

When operated under extreme conditions and heavy duty applications, the improved trailer hitch of this invention may develop a small amount of compression stress cracking of the flexible material in the area where the axial bore is in contact with the pintle means, i.e., on the upper and lower surfaces of said resilient material. Therefore, the axial bore may be chamfered to lessen the stress concentration and thereby lessen the chance of compression cracking of the resilient material.

It should be apparent that there has been provided in accordance with this invention a new and improved trailer hitch for coupling a draft vehicle to a drawn vehicle which overcomes the disadvantages of prior art devices of this type and which enables smooth and reliable operation without the wear and noise inherent in conventional pintle hook hitches.

Although only a preferred embodiment of the invention has been specifically illustrated and described herein, it is to be understood that minor modifications could be made therein without departing from the spirit of the invention.

What is claimed is:

1. A trailer hitch for coupling a draft vehicle to a drawn vehicle comprising a drawbar extending from one of said vehicles and having eye means mounted thereon, means extending from the other of said vehicles for receiving said eye means in coupling relation, pintle means axially extendable through said eye means and said receiving means for coupling said eye means and said receiving means, resilient means substantially completely surrounding said pintle means for maintaining said pintle means in spaced relation from said eye means and for yieldingly restraining relative radial movement between said pintle means and said eye means, said eye means including a ring-shaped housing having an annular channel formed in the inner periphery thereof, said resilient means being a molded insert of flexible material having an axial bore extending therethrough, and wherein said molded insert is mounted in the annular channel of said housing with an annular clearance which permits radial outward deformation of said insert into said channel when said pintle becomes axially inclined with respect to the axis of said eye means.

2. A trailer hitch as defined in claim 1, wherein said resilient means comprises an elastomeric material.

3. A trailer hitch as defined in claim 2, wherein said elastomeric material is a molded polyurethane plastic.

4. A trailer hitch as defined in claim 1, said receiving means comprising spaced upper and lower plates having coaxial holes formed therein for receipt of said pintle means therethrough, and wherein said pintle means includes a stop plate at one end thereof adopted to abut against said upper plate for limiting the axial extent of said pintle means therethrough.

5. A trailer hitch as defined in claim 1, said axial bore including a countersunk portion terminating in a shoulder, and said pintle means having a sleeve mounted thereon and adapted to abut against said shoulder for distributing compression loads applied by said pintle means over said molded insert.

6. A trailer hitch as defined in claim 1, said molded insert having a given radial dimension, and wherein said given radial dimension is greater than the greatest transverse cross-sectional dimension of said pintle extending therethrough.

7. A trailer hitch as defined in claim 1, wherein said molded insert is a bushing having a main body portion and an annular flange portion extending circumferentially around said main body portion, said flange portion being received in said annular channel.

8. A trailer hitch as defined in claim 7, wherein said main body portion comprises axially opposed frusto-conical portions which slope outwardly toward said annular flange portion.

9. A trailer hitch for coupling a draft vehicle to a drawn vehicle comprising a drawbar extending from one of said vehicles and having eye means mounted thereon, means extending from the other of said vehicles for receiving said eye means in coupling relation, pintle means axially extendable through said eye means and said receving means for coupling said eye means and said receiving means, resilient means substantially completely surrounding said pintle means for maintaining said pintle means in spaced relation from said eye means and for yieldingly restraining relative radial movement between said pintle means and said eye means, said eye means including a ring-shaped housing having an annular channel formed in the inner periphery thereof, said resilient means being a molded insert of flexible material having an axial bore extending therethrough, and wherein said molded insert is mounted in the annular channel of said housing, said axial bore including a countersunk portion terminating in a shoulder, and said pintle means having a sleeve mounted thereon and adapted to abut against said shoulder for distributing compression loads applied by said pintle means over said molded insert.

\* \* \* \* \*